US009683851B2

(12) United States Patent
Haverinen

(10) Patent No.: US 9,683,851 B2
(45) Date of Patent: *Jun. 20, 2017

(54) INDOOR MAGNETIC FIELD BASED LOCATION DISCOVERY

(71) Applicant: INDOORATLAS OY, Oulu (FI)

(72) Inventor: Janne Haverinen, Kiviniemi (FI)

(73) Assignee: INDOORATLAS OY, Oulu, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,576

(22) Filed: Sep. 14, 2015

(65) Prior Publication Data
US 2016/0003625 A1    Jan. 7, 2016

Related U.S. Application Data

(63) Continuation of application No. 13/739,640, filed on Jan. 11, 2013, now Pat. No. 9,151,621.

(30) Foreign Application Priority Data

Jan. 11, 2012 (FI) .................. 20125030
Jan. 11, 2012 (FI) .................. 20125031

(51) Int. Cl.
G01C 21/20 (2006.01)
G01S 5/02 (2010.01)
(Continued)

(52) U.S. Cl.
CPC ........... *G01C 21/206* (2013.01); *G01C 21/08* (2013.01); *G01S 5/0252* (2013.01); *G01S 5/0257* (2013.01); *G01V 3/02* (2013.01)

(58) Field of Classification Search
CPC ................... G01C 21/206; G01S 5/0257
(Continued)

(56) References Cited

U.S. PATENT DOCUMENTS 3,728,525 A    4/1973 Adkar
5,884,218 A    3/1999 Nimura et al.
(Continued)

OTHER PUBLICATIONS

Vallivaara et al. "Simultaneous Localization and Mapping Using Ambient Magnetic Field." 2010 IEEE International Conference on Multisensor Fusion and Integration for Intelligent Systems, Utah, Sep. 5-7. 2010.
(Continued)

*Primary Examiner* — Jerrah Edwards
*Assistant Examiner* — Majdi Alsomiri
(74) *Attorney, Agent, or Firm* — Oliff PLC

(57) ABSTRACT

There is provided an apparatus, wherein the apparatus is caused to acquire a location estimate of a positioning device that is to determine its location inside a building, wherein the location estimate is acquired on the basis of an indoor non-magnetic field based location discovery system; access an indoor Earth's magnetic field, EMF, map of plurality of buildings, wherein the indoor EMF map represents at least one of magnitude and direction of the Earth's magnetic field affected by the local structures of a corresponding building; and select a part of the indoor EMF map on the basis of the location estimate of the positioning device, wherein the selected part of the indoor magnetic field map includes the indoor EMF map for the area in which the positioning device currently is.

19 Claims, 8 Drawing Sheets

(51) Int. Cl.
  *G01C 21/08* (2006.01)
  *G01V 3/02* (2006.01)
(58) Field of Classification Search
  USPC .......................................................... 701/525
  See application file for complete search history.

(56) References Cited

U.S. PATENT DOCUMENTS

| | | | |
|---|---|---|---|
| 6,269,324 | B1 | 7/2001 | Rakijas et al. |
| 6,459,989 | B1 | 10/2002 | Kirkpatrick et al. |
| 7,162,368 | B2 | 1/2007 | Levi et al. |
| 7,373,152 | B2 | 5/2008 | Oesterling |
| 7,747,409 | B2 | 6/2010 | Ladetto et al. |
| 7,912,633 | B1 | 3/2011 | Dietsch et al. |
| 2007/0150195 | A1 | 6/2007 | Koskan et al. |
| 2009/0043504 | A1 | 2/2009 | Bandyopadhyay et al. |
| 2010/0305851 | A1 | 12/2010 | Meyer et al. |
| 2010/0315287 | A1 | 12/2010 | Karpitski |
| 2012/0143495 | A1 | 6/2012 | Dantu |
| 2012/0232838 | A1 | 9/2012 | Kemppi et al. |
| 2013/0179075 | A1* | 7/2013 | Haverinen ............. G01C 21/08 701/525 |
| 2014/0180589 | A1 | 6/2014 | Kim et al. |
| 2014/0343846 | A1* | 11/2014 | Goldman ............. G01C 21/206 701/525 |
| 2015/0260523 | A1* | 9/2015 | Haverinen ............. G01C 21/08 455/457 |
| 2015/0260524 | A1* | 9/2015 | Haverinen ............. G01C 21/08 455/456.1 |

OTHER PUBLICATIONS

Storms et al. "Magnetic Field Navigation in an Indoor Environment." Ubiquitous Positioning Indoor Navigation and Location Based Service, Oct. 14-15, 2010.

Navarro et al. "Magnetic Map Building for Mobile Robot Localization Purpose." Emerging Technologies & Factory Automation, Sep. 22-25, 2009.

Haverinen et al. "Global Indoor Self-Localization Based on the Ambient Magnetic Field." Robotics and Autonomous Systems 57, pp. 1028-1035, 2009.

Jul. 28, 2014 Office Action issued in U.S. Appl. No. 13/739,640.

Dec. 18, 2014 Office Action issued in U.S. Appl. No. 13/739,640.

* cited by examiner

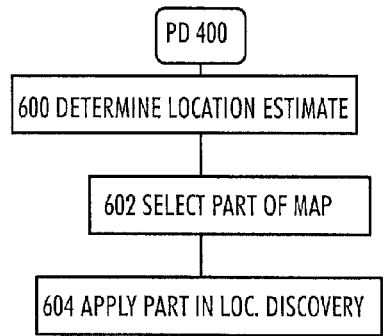
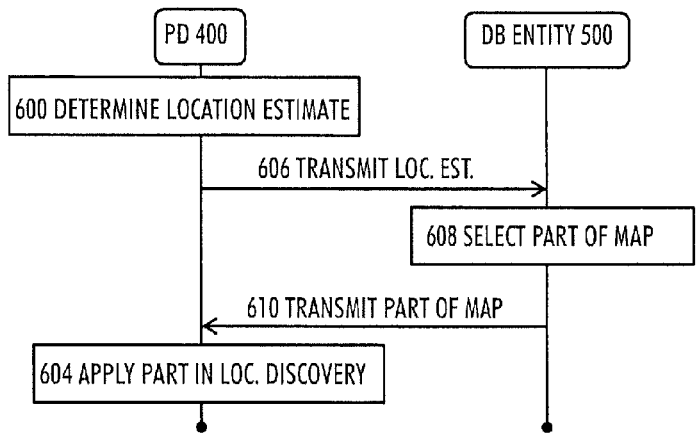
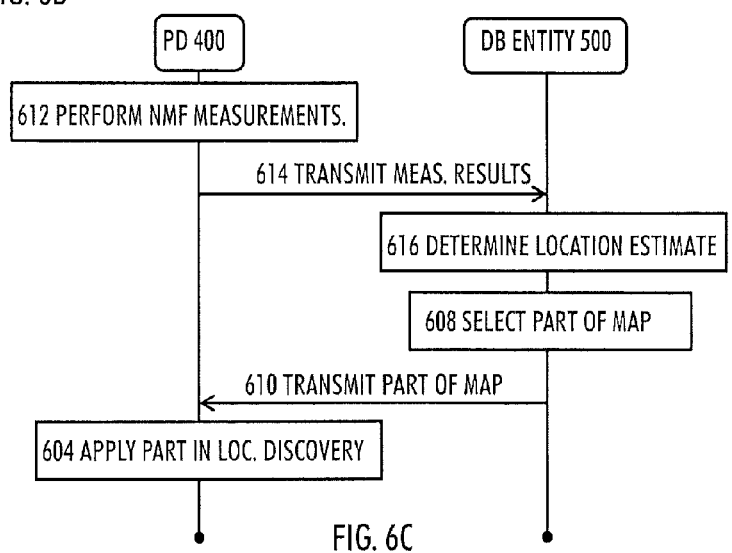

INDOOR MAGNETIC FIELD BASED LOCATION DISCOVERY

This application is a continuation application of U.S. patent application Ser. No. 13/739,640, filed Jan. 11, 2013, and claims the benefit of priority from Finnish Patent Application Nos. 20125031 and 20125030, both filed on Jan. 11, 2012. The prior applications, including the specifications, drawings and abstracts are incorporated herein by reference in their entirety.

FIELD

The invention relates generally to indoor positioning systems. More particularly, the invention relates to indoor location tracking by applying both, Earth's magnetic field based location discovery and non-magnetic field based location discovery.

BACKGROUND

It may be of importance to locate or track a user when the user is inside a building. However, a well-known outdoor positioning system employing a global positioning system (GPS) or any other satellite based system may not work inside a building due to lack of reliable reception of satellite coverage. Therefore, a positioning technique utilizing Earth's magnetic fields (EMF) indoors has been developed as one possible option for indoor location discovery. This type of location discovery applies, for example, a magnetic field strength measured by a positioning device.

BRIEF DESCRIPTION OF THE INVENTION

According to an aspect of the invention, there is provided a computer program product embodied on a distribution medium readable by a computer and comprising program instructions which, when loaded into an apparatus, cause the apparatus to execute any of the embodiments as described in the appended claims.

According to an aspect of the invention, there is provided an apparatus comprising means configured to cause the apparatus to perform any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a floor plan of a building;

Figure 5A:
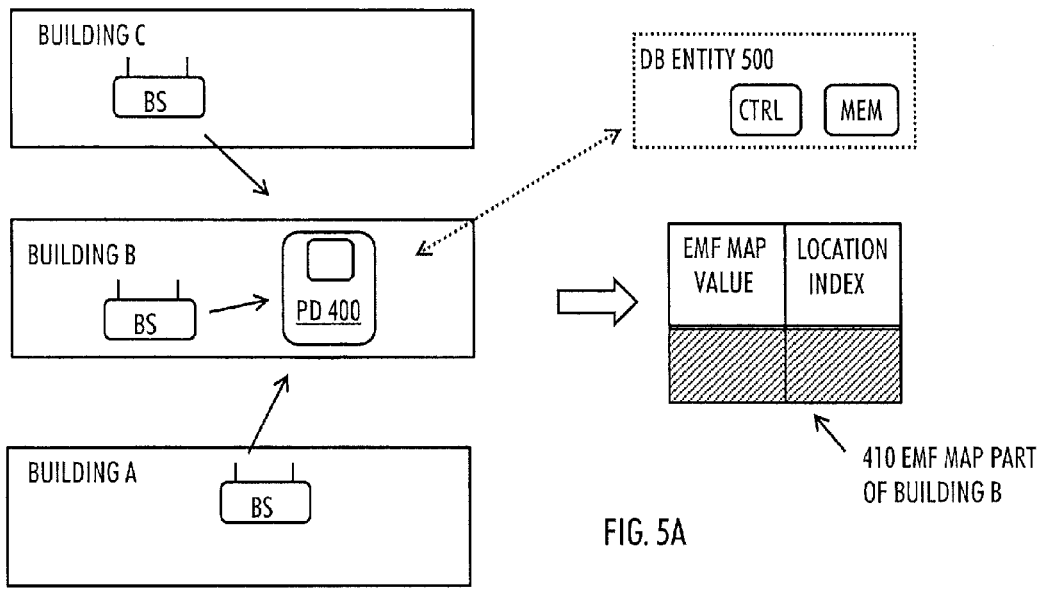
Figure 5B:
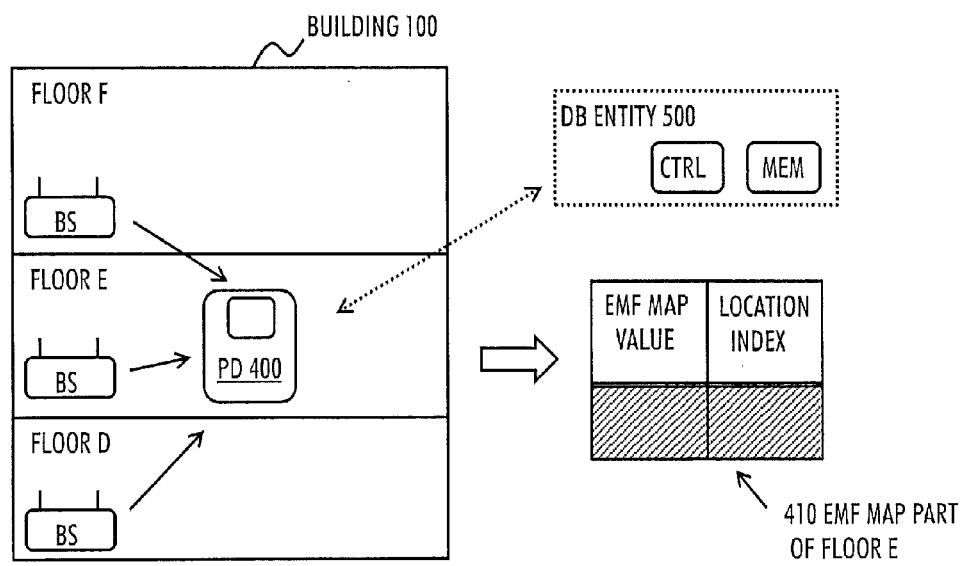
Figure 7A:
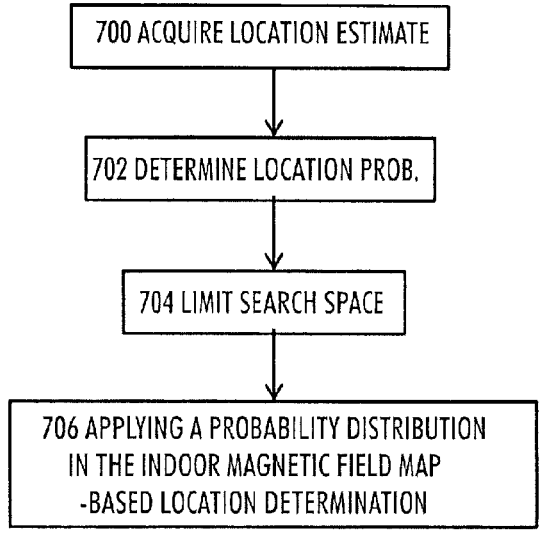
Figure 7B:
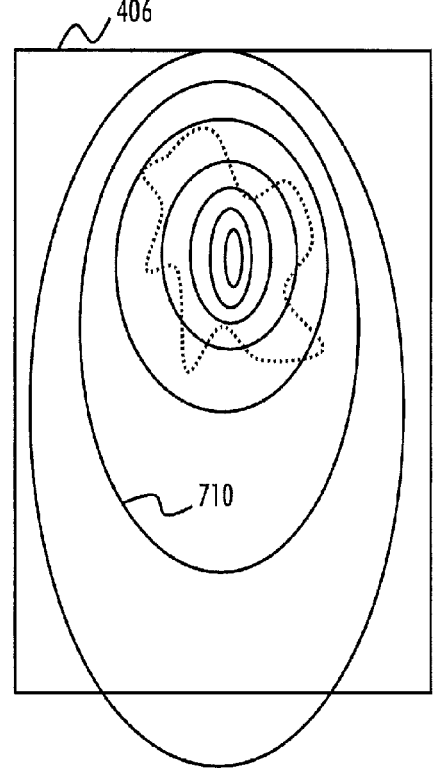
Figure 8A:
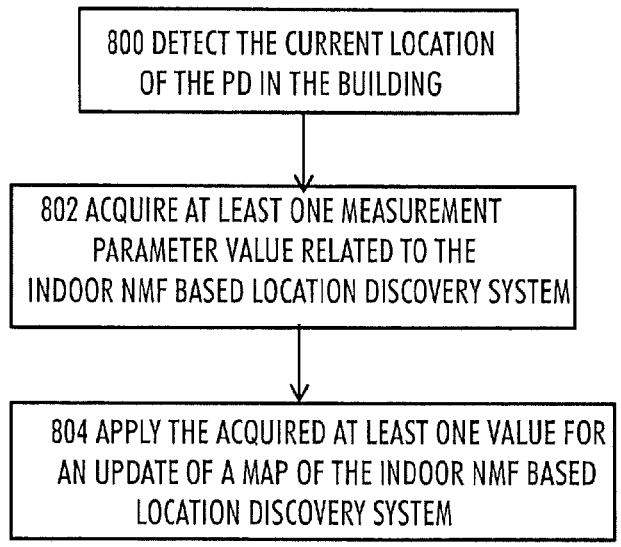
Figure 8B:
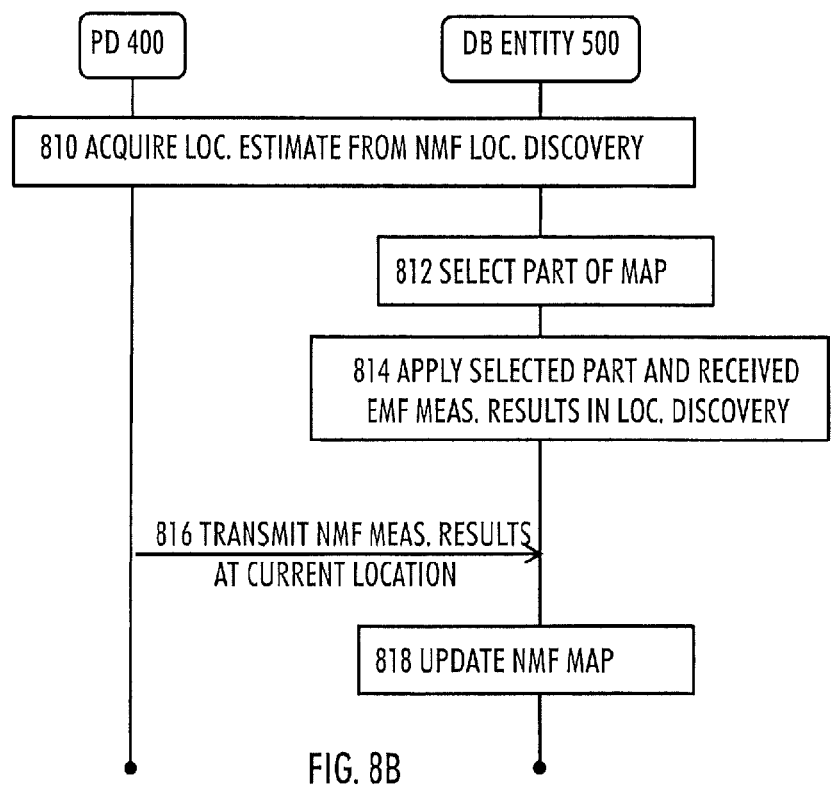
Figures 9A, 9B, 9C:
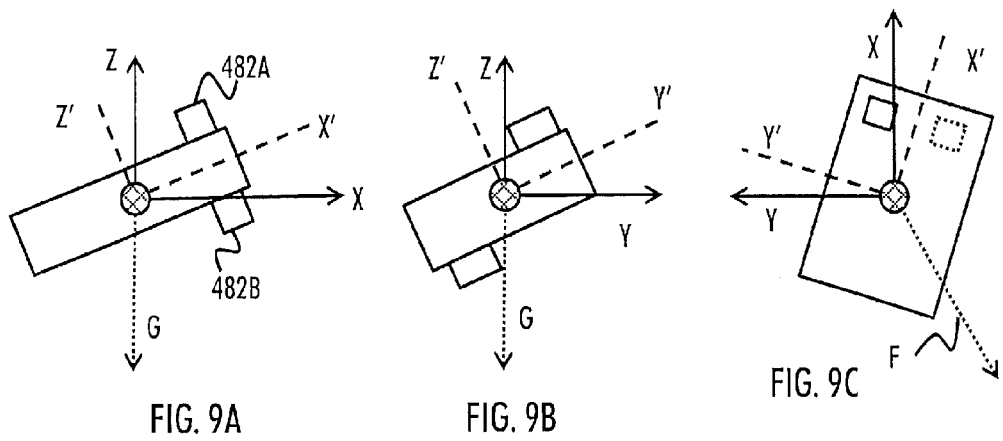
Figure 10:
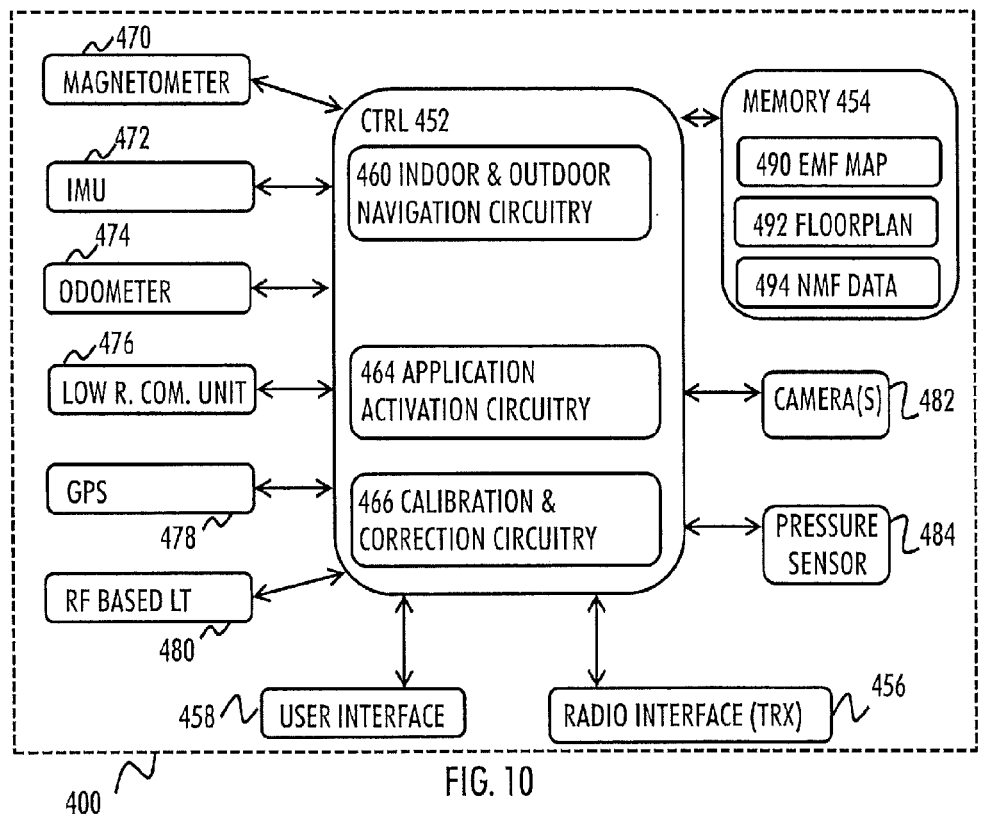
Figure 11:
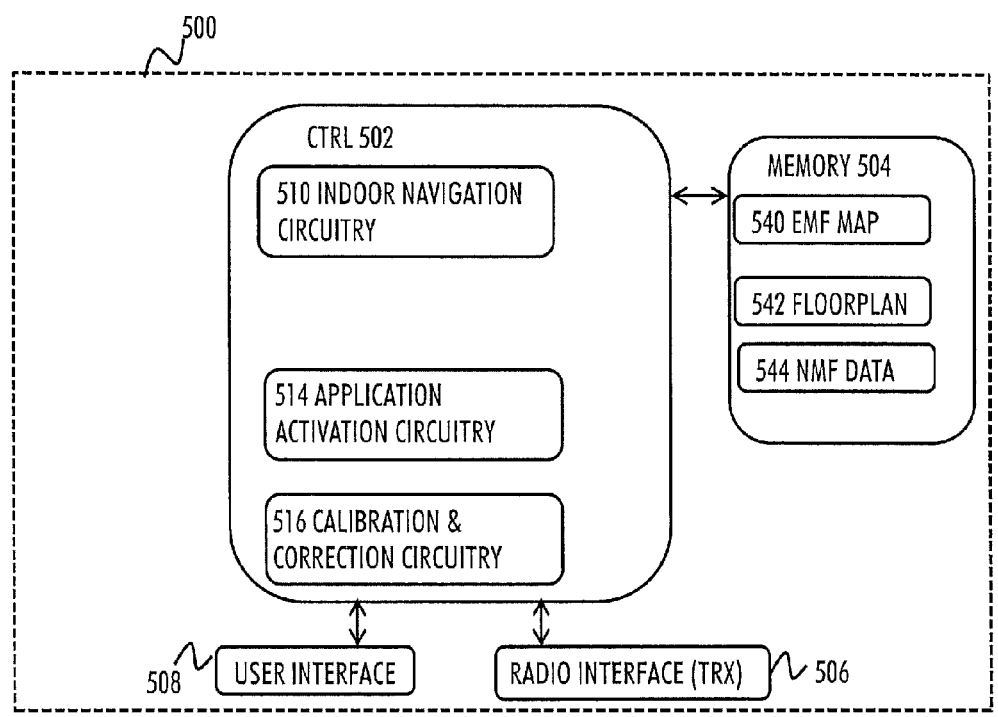

FIGS. 5A and 5B present some embodiments relating to the location estimation;

FIGS. 6A to 6D show signaling flow diagrams, according to some embodiments;

FIGS. 7A and 7B illustrate some embodiments related to use of probabilities for the location of a positioning device;

FIGS. 8A and 8B show some embodiment relating to update of a non-magnetic filed based map;

FIGS. 9A to 9C show possible three dimensional orientations of the positioning device; and FIGS. 10 and 11 illustrate apparatuses according to embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In order to enable positioning, a GPS based location discovery and/or tracking is known. The GPS location discovery may not, however, be suitable for indoors due to lack of satellite reception coverage. For indoor based location tracking, RF based location discovery and location tracking may be used. In such system, a round trip time of the RF signal, or the power of the received RF signal, for example, may be determined to an indoor base station to which the user device is connected to. This type of location tracking may suffer from a lack of accuracy, for example, when the user gets located by two different RF base stations. Also, the coverage area of one base station may be wide resulting in poor accuracy. Some other known positioning measures, which may be applicable indoors, include machine vision, motion sensor and distance measuring, for example. However, these may require expensive measuring devices and equipment mounted throughout the building. As a further option, the utilization of Earth's magnetic field (EMF) may be applied.

The material used for constructing the building may affect the EMF measurable in the building and also the EMF surrounding the building. For example, steel, reinforced concrete, and electrical systems may affect the EMF. The EMF may vary significantly between different locations in the building and may therefore enable accurate location discovery and tracking inside the building based on the EMF local deviations inside the building. On the other hand, the equipment placed in a certain location in the building may not affect the EMF significantly compared to the effect caused by the building material, etc. Therefore, even if the layout and amount of equipment and/or furniture, etc., change, the measured EMF may not change significantly.

Figure 1:
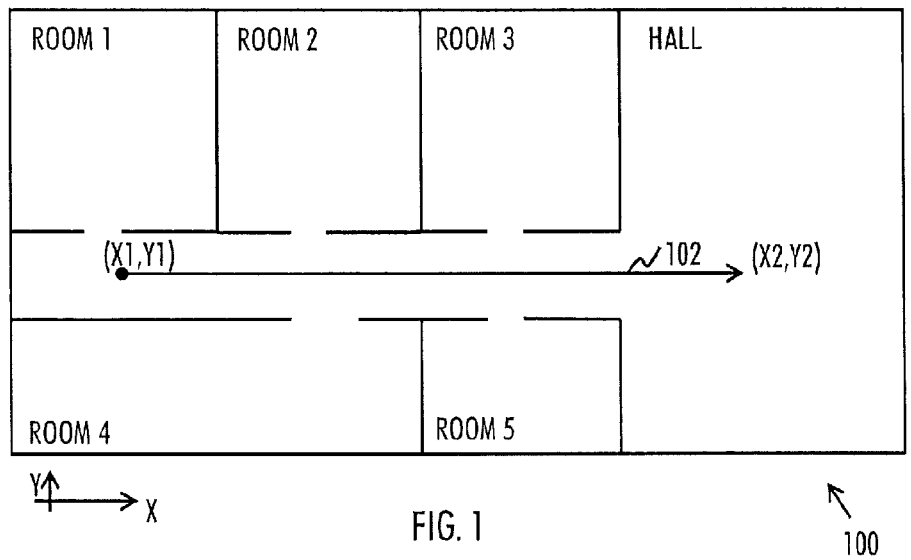

An example of a building 100 with 5 rooms, a corridor and a hall is depicted in FIG. 1. It is to be noted that the embodiments of the invention are also applicable to other type of buildings, including multi-floor buildings. The floor plan of the building 100 may be represented in a certain frame of reference. A frame of reference may refer to a coordinate system or set of axes within which the position, orientation, etc. are measured, for example. Such a frame of reference of the building in the example of FIG. 1 may be an XY coordinate system, also known in this application as the world coordinate system. The coordinate system of the building 100 may also be three dimensional when vertical dimension needs to be taken into account.

The vertical dimension is referred with Z, whereas X and Y together define a horizontal two-dimensional point (X, Y). In FIG. 1, the arrow starting at a point (X1, Y1) and ending at a point (X2, Y2) may be seen as a path 102 traversed by a user associated with an EMF positioning device. The Z dimension is omitted for simplicity. The positioning device is detailed later, but for now it may be said, that the positioning device may comprise a magnetometer or any other sensor capable of measuring the EMF, such as a Hall sensor or a digital compass. The magnetometer may comprise at least one orthogonal measuring axis. However, in an embodiment, the magnetometer may comprise three-dimensional measuring capabilities. Yet in one embodiment, the magnetometer may be a group magnetometer, or a magnetometer array which provides magnetic field observation simultaneously from multiple locations spaced apart. The magnetometer may be highly accurate sensor and even small variations in the EMF may be noticed. In addition to the strength, also known as magnitude, intensity or density, of the magnetic field (flux), the magnetometer may be capable of determining a three-dimensional direction of a measured EMF vector. To this end, it should be noted that at any location, the Earth's magnetic field can be represented by a three-dimensional vector. Let us assume that a compass needle is tied at one end to a string such that the needle may rotate in any direction. The direction the needle points, is the direction of the Earth's magnetic field vector.

Figure 2A:
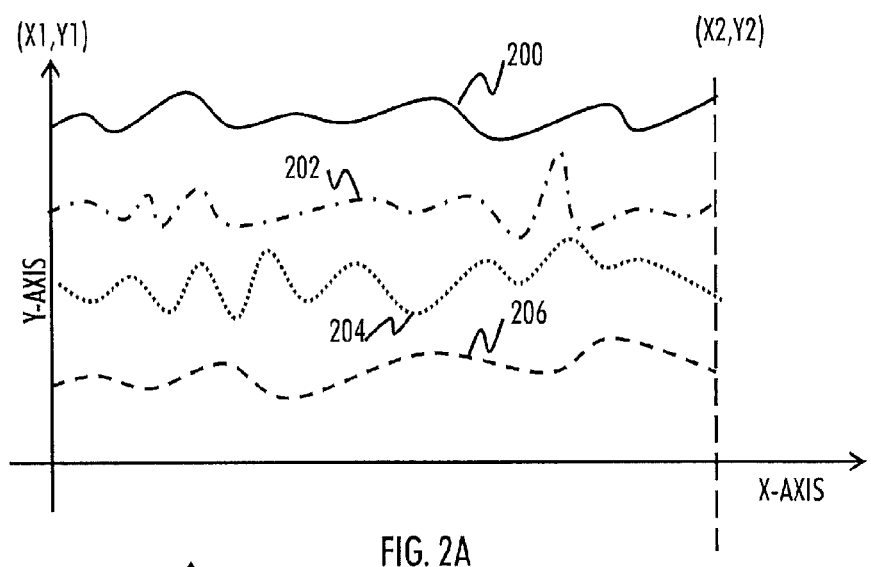
FIGS. 2A to 2C show a positioning device and an example measured magnetic field vector.
Figure 2B:
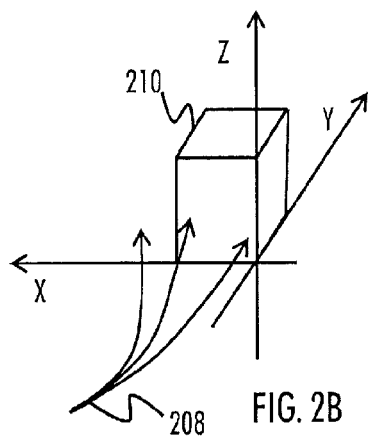
Figure 2C:
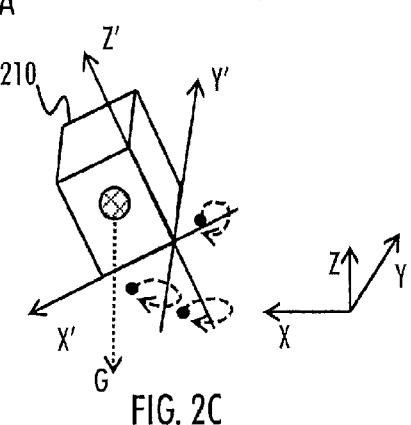

As said, the magnetometer carried by a person in the device traversing the path 102 in FIG. 1 is capable of determining the three-dimensional magnetic field vector. Example three components of the EMF vector as well as the total strength are shown in FIG. 2A throughout the path 102 from (X1, Y1) to (X2, Y2). The solid line 200 may represent the total strength of the magnetic field vector and the three other lines 202 to 206 may represent the three component of the three dimensional magnetic field vector. For example, the dot-dashed line 202 may represent the Z component (vertical component), the dotted line 204 may represent the X component, and the dashed line 206 may represent the Y component. From this information, the magnitude and direction of the measured magnetic field vector may be extracted. FIG. 2B shows how the Earth's magnetic field 208 may be present at the location of an object 210. In FIG. 2B, the object 210 is oriented in the three-dimensional space (XYZ) according to the frame of reference of the building. However, typically the object is moving and the three-dimensional orientation of the object 210 may vary from the frame of reference of the building as shown in FIG. 2C. In this case, the three-dimensional frame of reference is not for the building but for the object 210, such as for the positioning device. Such frame of reference may be denoted with X', Y', and Z' corresponding to rotated X, Y, and Z of the world coordinate system. The G vector in FIG. 2C denotes the gravitational force experienced by the object 210.

In location tracking of the positioning device or any target object moving in the building 100, the EMF vector measured by the positioning device carried by the user may be compared to existing information, wherein the information may comprise EMF vector strength and direction in several locations within the building 100 or within a plurality of buildings. The information may thus depict an indoor Earth's magnetic field map. The map may cover one building or many buildings. The positioning device of the user may comprise at least part of the EMF map, the positioning device may access the EMF map stored somewhere else in a network accessible by the positioning device, or the positioning device may forward the measured EMF vector data to a database entity or server which comprises or has access to the EMF map and thus is capable to locate the user in the building. Preferably but not necessarily, the EMF map covers most or all of the building(s) so that the user may be reliably located without "black spots".

Figure 3:
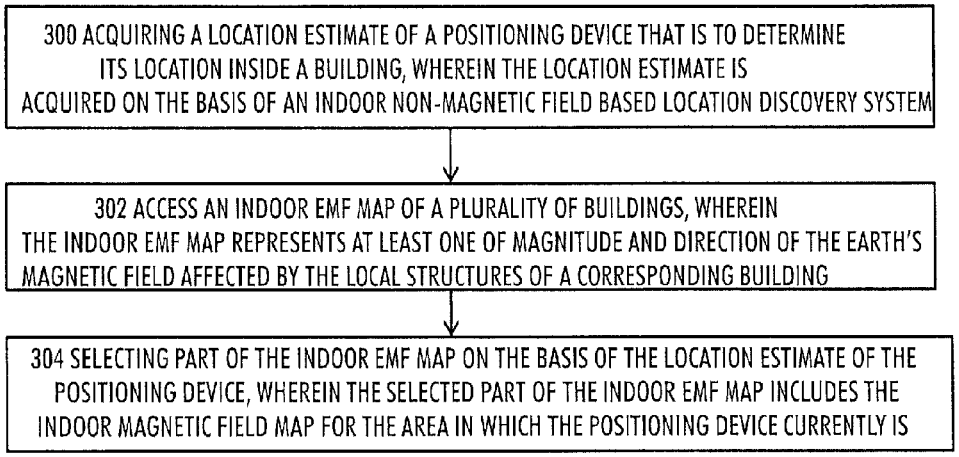
FIG. 3 shows a method according to an embodiment.

As said the positioning device may acquire the EMF vector by performing measurements with the in-built magnetometer, for example. However, the amount of data in the EMF map may be vast. Therefore, the utilization of the EMF map may be problematic, time-consuming and computationally demanding. In order to at least partially solve the above mentioned drawbacks, it is proposed, as shown in FIGS. 3 and 4, that the positioning device (PD) 400 or the database entity (DBE) 500 acquires, in step 300, a location estimate 402 of the PD 400 that is to determine its location inside the building 100. The location estimate 402 is acquired on the basis of an indoor non-magnetic field (NMF) based location discovery system. As the name implies, the location estimate may be only an estimate: it may not accurately represent the exact location of the PD 400 but only give an estimation of the PD's 400 location. This may be because the indoor NMF based location discovery system may not be as accurate as the EMF based discovery. Alternatively, the estimate is accurate, but lacks efficiency otherwise, as will be described. As will be described later, the location estimate 402 may be used to improve the efficiency of EMF based location discovery, for example.

The location estimate 402 may cover a single continuous area or zone within the map, such as one building, one floor, one room, or one part of a floor, etc. However, in another embodiment, the location estimate covers several floors or rooms, etc. In yet one embodiment, the location estimate may comprise two or more separate areas (i.e. not only one continuous area) within the map. For example, the location of the PD 400 may be estimated to be in the room A of the floor N, or in the room C of the floor N+1. These two rooms may form two separate parts of the building.

The indoor NMF based location discovery system, which is used as a basis for the location estimate 402, may be in an embodiment one of the following: an indoor radio frequency base station based location discovery system, a system comprising at least one camera image, a system applying BLUETOOTH™, a system applying radio frequency identification, a system comprising an air pressure sensor. Further, a system comprising an odometer and/or an inertial measurement unit may be used as an additional location discovery means. For example, if the building is equipped with another location discovery system, such as for example the indoor base station based location discovery, the information provided by that other location technique may be used. Such additional data may obtained by an RF based location tracking unit of the PD 400, transmitted to the DBE 500 and processed in the DBE 500, for example. The information stored relating to the other non-magnetic based navigation system may comprise the mounting location of the indoor base stations, radio maps comprising RF signal strength values at different location, a map of atmospheric pressure sensor values at several locations, for example. As an example, it may be said that the indoor radio frequency (RF) base station based location discovery system may apply a wireless local area network (WLAN, WiFi). The location estimate 402 may be obtained by the PD 400 by measuring the received signal strength indicators (RSSI) from the WLAN signals from WLAN base stations, such as a beacon from the base station 404, for example. Alternatively a round trip time, direction or arrival, or any other discovery technique applying RF base stations 404 indoors which is known to a skilled person, may be used. Alternatively or in addition to, other discovery means may be applied, such as odometers, inertial measurement units, air pressure sensors, camera images, BLUETOOTH™, radio frequency identification (RFID).

As an example, it may be said that the indoor radio frequency (RF) base station based location discovery system may apply a wireless local area network (WLAN, WiFi).

The location estimate 402 may be obtained by the PD 400 by measuring the received signal strength indicators (RSSI) from the WLAN signals from WLAN base stations, such as a beacon from the base station 404, for example. Alternatively a round trip time, direction or arrival, or any other discovery technique applying RF base stations 404 indoors which is known to a skilled person, may be used. Alternatively or in addition to, other discovery means may be applied, such as odometers, inertial measurement units, air pressure sensors, camera images, BLUETOOTH™ radio frequency identification (RFID). In an embodiment, the location estimate may be obtained on the basis of at least one image captured by the PD 400 and compared to a database of images representing the control points. The image may have been captured when the three-dimensional orientation of the PD 400 is according to predetermined rules. The database of images may reside in the memory of the PD 400 or of the database entity 500. In the latter case, either the database of images is accessible by the PD 400 or the images captured by the PD 400 are transmitted to the database entity 500 for review.

In an embodiment, the indoor location estimate of the PD 400 may be identified on the basis of the NMF based location discovery, wherein the NMF based location discovery applies a low range data transfer performed by the PD 400. The low range data transfer applies at least one of the following: a radio frequency identification (RFID) technique, a BLUETOOTH™ communication protocol, a machine readable bar code, a IEEE 802.15.4 communication protocol. The PD 400 may be equipped with suitable hardware and software (a low range communication unit) which allows the PD 400 to communicate through the low range communication. For this reason, there may be another low range communication unit mounted at a predetermined location, such as close to the entry point of the building, for example. As the predetermined location of the mounted unit is known, the initialization of the PD 400 with the identified location estimate may be performed. For example, the location may be stored in the memory operatively coupled to the mounted unit in order to initialize the PD 400 with the indoor location estimate corresponding to the identified location (i.e. the predetermined location of the mounted low range communication unit). The mounted low range communication unit may provide communication properties in such a low range that it may be assumed that the PD 400, when communicatively coupled to the mounted low range communication unit, is in the same physical location as the mounted low range communication unit. This may allow for fast convergence of the location estimation of the PD 400.

For example, let us assume that the mounted low range communication unit is the first RFID unit. Then, the PD 400 comprising a second RFID unit may read information comprised in the first RFID unit. The information may comprise the location of the first RFID unit, for example. Based on this information, the PD 400 may initialize its location estimate. The PD 400 may also activate the indoor navigation system, if not already activated. The information may be comprised in the memory coupled to the first RFID unit, or the first RFID unit may provide access information to a network element where the information is stored. Alternatively, the first RFID unit may read information from the second RFID unit 476 of the PD 400, wherein the information may comprise network access address of the PD 400. Then network access equipment couple to the first RFID unit may cause the initialization of the PD 400 with the location estimate and possibly with the EMF map data through the network. In either case, the data may also provide information enabling a network access establishment between the PD 400 and a network element, such as the database entity 500. The information may include network address of the PD 400 and/or the network address of the network element, such as the database entity 500.

In an embodiment, the indoor location estimate of the PD 400 may be identified on the basis of the NMF based location discovery, wherein the NMF based location discovery applies a low range data transfer performed by the PD 400. The low range data transfer applies at least one of the following: a radio frequency identification (RFID) technique, a BLUETOOTH™, communication protocol, a machine readable bar code, a IEEE 802.15.4 communication protocol. The PD 400 may be equipped with suitable hardware and software (a low range communication unit) which allows the PD 400 to communicate through the low range communication. For this reason, there may be another low range communication unit mounted at a predetermined location, such as close to the entry point of the building, for example. As the predetermined location of the mounted unit is known, the initialization of the PD 400 with the identified location estimate may be performed. For example, the location may be stored in the memory operatively coupled to the mounted unit in order to initialize the PD 400 with the indoor location estimate corresponding to the identified location (i.e. the predetermined location of the mounted low range communication unit). The mounted low range communication unit may provide communication properties in such a low range that it may be assumed that the PD 400, when communicatively coupled to the mounted low range communication unit, is in the same physical location as the mounted low range communication unit. This may allow for fast convergence of the location estimation of the PD 400.

Figure 4A:
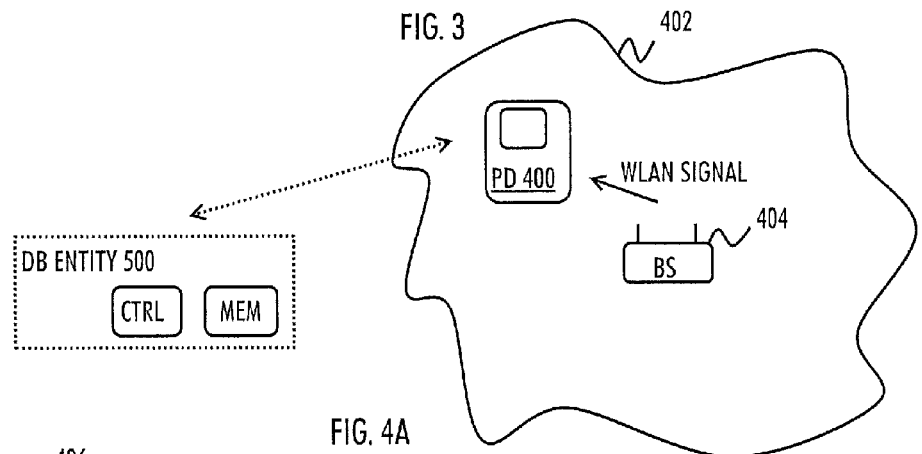
FIGS. 4A and 4B illustrate embodiments relating to the location estimation and selection of a map part, according to some embodiments.

In order to acquire the location estimate, the PD 400 may need to perform some measurements, such as the RSSI measurements. As shown in FIG. 4A, the PD may have received a WLAN signal from the WLAN base station 404. Based on the detected signal strength and the knowledge of the location of the base station 404, the location of the PD 400 may be estimated to be in the vicinity of the base station 404, as shown with the curve 402. The location estimate of the PD 400 may be determined by the position device 400 itself or by a database entity 500 to which location related information from the PD 400 is sent via a wireless interface, as will be described later.

In step 302, the PD 400 or the DBE 500 accesses the indoor EMF map of a plurality of buildings, possibly including the building 100. As said, the indoor EMF map represents at least one of magnitude and direction of the earth's magnetic field 208 affected by the local structures of the building 100. The EMF map may be generated on the basis of a plurality of EMF measurements performed by one or more mapping devices, which measure the EMF vectors at several locations in one or more buildings. Any person may contribute in the generation of the magnetic field map for indoors. Such crowd sourcing approach may provide an efficient manner in acquiring the EMF map for a large number of buildings. Any person may apply a measuring device, or a mapping device, in order to measure the EMF vectors indoors and thus contribute in generation of EMF map. The measuring device applied by each person may be his/her mobile phone or any mobile device. This may be possible as today's mobile devices may be equipped with a magnetometer and radio interface components, for example. The mapper may measure the EMF vector in a certain location/path and provide the measured data to a central database entity, for example. The measured at least one of magnitude and direction of the earth's magnetic field 208 may be recorded in the map for each location. In an embodiment the PD 400 stores the EMF map in its memory. In an embodiment, it may be that the DBE 500 stores the map. In an embodiment, alternatively, it may be that the EMF map is stored somewhere in the network and the corresponding device 400/500 has wireless access to the information comprised in the EMF map.

Figure 4B:
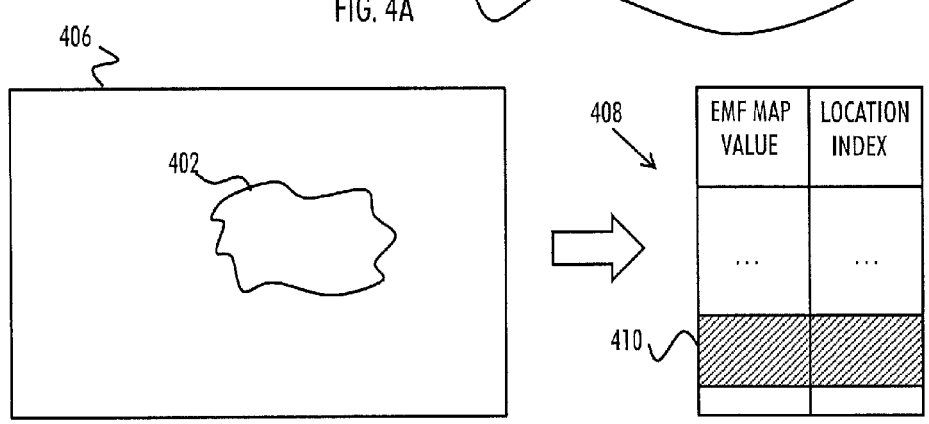

Let us assume that the block 406 in FIG. 4B represent an area for which the map has been generated. The area 406 may comprise a plurality of buildings, for example. Let us further assume that the table 408 represents the EMF map for the area 406. Now the acquired location estimate 402 may be used to narrow the area in which the PD 400 is currently present.

For example, when the indoor EMF based positioning system applies multi-hypothesis location estimation, the number of different hypothesis may in the beginning include over 1000 location hypothesis for the PD 400. Therefore, it may be understood that it may take a lot of time to converge to the correct hypothesis. By enabling the initial location estimate, the efficiency of the location discovery is increased as the number of location hypothesis may be reduced closer to the identified location estimate. Thus, the time of convergence to the correct location may be reduced.

Thereafter, in step 304, the device 400 or 500 may select a part 410 of the indoor EMF map 408 on the basis of the acquired location estimate 402 of the PD 400, wherein the selected part 410 of the indoor EMF map 408 includes the indoor EMF map for the area in which the PD 400 currently is, that is, for the area corresponding to the location estimate 402. This selected area may be a building, a floor of a multi-story building, a part or a room of one floor, etc. Alternatively the selected part 410 may comprise two separate subparts of the map 408, such as a map part covering the room A of the floor N and a map part covering the room C of the floor N+1. In an embodiment, the selected part covers the entire EMF map 408. This may be the case when the location estimate 402 does not provide very accurate estimate of the location. In another embodiment, the selected part 410 is smaller than the entire map EMF 408. This may be a more typical case in which the location estimate 402 implies the location of the PD 400 with some relatively good accuracy, such as within one building, within a few floors or within a few rooms. In such case the other improbable locations covered with the EMF map 408 may be disregarded and only a relatively small part 410 covering the probable locations of the PD 400 is processes further. There may be predefined rules on how large one part is. For example, if it is detected that the PD 400 is in a certain building, the part of the map may cover the whole building. In case it is determined that the PD 400 in is a certain floor, the part of the map may cover the whole building where the floor is, only the floor, or only a part (such as a room) of the floor. FIG. 4B shows the selected part 410 of the EMF map 408 with a part having right leaning diagonal lines, for example. It may be advantageous to select such part 410 of the EMF map 408 because then the search space used for the EMF based location discovery is narrowed to cover only the selected part 410, not the whole map 408. This may provide advantages in computational efficiency, data transfer efficiency, as will be described.

Further, this may enable the location of the PD 400 (and the person carrying the PD 400) to be detected fast. For example, assume a person needs to be located in a building in case of emergency. Such technique may be needed in an enhanced 911 (E-911), which is a location technology advanced by the federal communication commission (FCC) that may enable mobile, or cellular, phones to process 911 emergency calls and enable emergency services to locate the geographic position of the caller. Now, according to the proposed scenario, the location estimate is first obtained by applying the NMF based location discovery techniques, such as WLAN base stations, cellular base stations, BLUETOOTH™, etc. The location estimate may be used to narrow down the search space for the to-be-applied EMF based location discovery (e.g. selecting the part 410 of the EMF map 408 instead the whole EMF map 408). By doing this, the EMF based location discovery may converge faster to the correct location hypothesis. Thereafter, more accurate location discovery and/or possibly tracking of the user with the PD 400 may be conducted with at least the EMF based location discovery. This may help in saving time when the location of the person in emergency need to be determined as fast as possible Further, this may enable the location of the PD 400 (and the person carrying the PD 400) to be detected fast. For example, assume a person needs to be located in a building in case of emergency. Such technique may be needed in an enhanced 911 (E-911), which is a location technology advanced by the federal communication commission (FCC) that may enable mobile, or cellular, phones to process 911 emergency calls and enable emergency services to locate the geographic position of the caller. Now, according to the proposed scenario, the location estimate is first obtained by applying the NMF based location discovery techniques, such as WLAN base stations, cellular base stations, BLUETOOTH™, etc. The location estimate may be used to narrow down the search space for the to-be-applied EMF based location discovery (e.g. selecting the part 410 of the EMF map 408 instead the whole EMF map 408). By doing this, the EMF based location discovery may converge faster to the correct location hypothesis. Thereafter, more accurate location discovery and/or possibly tracking of the user with the PD 400 may be conducted with at least the EMF based location discovery. This may help in saving time when the location of the person in emergency need to be determined as fast as possible.

In another embodiment, let us assume that the building 100 is a multi-story building, that is, there may be a plurality of floors D, E, F in the building 100, as shown in FIG. 5B. Assuming the indoor NMF based location discovery applies the WLAN base stations, it may be that there is WLAN base station present in each floor or only in some floors. Consequently, the PD 400 may receive the strongest WLAN signal from the base station present in the floor in which the PD 400 currently is. As another or additional embodiment, an air pressure sensor of the PD 400 may be used to indicate the floor in which the PD 400 currently is located. The measured value of the PD 400 may indicate the altitude of the PD 400. As the typical room height is known, the air pressure sensor measurement result may be used to indicate, approximately, the floor in which the PD 400 is located.

For example, assume a scenario where a person carrying the PD 400 takes the elevator. When the person arrives in the floor of destination and exits the elevator, it may be advantageous to go back to accurate EMF based location tracking as early as possible. However, the part of the journey traveled in the elevator may have caused the EMF based location discovery system to lose track of the person. Therefore, as the person exits the elevator in a floor N, for example, the location discovery may be able to immediately know that the current floor is the floor N. Consequently, it may need to locate the person by applying a vast number of initial location hypotheses, possibly covering several floors. This may take some time. However, providing a location estimate, for example on the basis of the non-magnetic field WLAN base station aided location discovery, may help the EMF based location discovery to convergent faster. This is because the location hypothesis in floors or rooms not corresponding to the location estimate may be discarded.

Therefore, in an embodiment, the corresponding device, either the PD 400 or the DBE 500, may identify, on the basis of the acquired location estimate 402, that the PD 400 currently is in the floor E of the multi-story building 100. The selected part 410 of the indoor EMF map 408 may then include the indoor EMF map for the identified floor E of the multi-story building 100. The selected part 410 may not comprise EMF map coverage for any other floor. The PD 400 may select the part 410 in case it has access to the map 408 and has estimated the location of itself. In another embodiment, the DBE 500 may select the part 410 in case it has access to the map 408 and has acquired (received or determined) the location of the PD 400.

In yet one embodiment, the corresponding device, either the PD 400 or the DBE 500, may identify, on the basis of the acquired location estimate 402 that the PD 400 is currently within a predetermined number of floors. The predetermined number may depend on what type of measurement results are used for the location estimation. For example, when WLAN base stations are used, it may be accurate enough to limit the location of the PD 400 within three adjacent floors D, E and F of the building 100. It should be noted that there may be, for example, tens of floors in one building 100. The reason for narrowing the floors to three may be that a certain base station located in the floor N may, with a high probability, provide the strongest signal, among all the WLAN base station signals in the building 100, to the floor N, to the floor N−1 or to the floor N+1. For example, there may be obstacles in the air interface between the base station located in the floor N and the PD 400. In this case, the base station in the floor N−1 or N+1 may provide a stronger signal to the PD 400 in the floor N, which may lead the location estimate to imply that the PD 400 is in the floor N−1 or N+1. In case, the WLAN signal measurements result in acquiring the strongest signal from the floor N−1, then the candidate three floors may be N−2, N−1, and N. By limiting the floors to three adjacent floors may be beneficial in that the correct floor (i.e. the floor N) is among the candidate floors. When applying the air pressure sensor, or a barometer, for implying the floor in which the PD 400 is located, the predetermined number of candidate floors may be larger, for example. Thereafter, the selected part of the EMF map may be a part which comprises a map part covering the predetermined number of adjacent floors (such as the floors N, N+1, N−1) of the building 100. The selected part 410 may not comprise EMF map coverage for any other floor. The PD 400 may select the part 410 in case it has access to the map 408 and has estimated the location of itself. In another embodiment, the DBE 500 may select the part 410 in case it has access to the map 408 and has acquired (received or determined) the location of the PD 400.

In an embodiment, the topology and/or layout of the relevant building, in which the PD is estimated to be currently located, is taken into account in defining the location estimate further. In other words, the layout of the rooms, halls, elevators, walls, may be taken into account when limiting or adjusting the area in which the PD 400 currently is. Topologies and/or layouts of the buildings may be known and stored beforehand in the PD 400 or in the DBE 500. For example, it may be that the location estimate indicates that the PD 400 is in floor N of the building. However, it may be that there is an elevator shaft, a publicly restricted or secured zone, etc. within that floor N. Based on this knowledge, the location estimate, otherwise covering the whole floor N, may be narrowed or limited by excluding those improbable areas from the map of the floor N. Such further defining of the location estimate 402 may aid in selecting a smaller part 410 of the EMF map 408, which may consequently lead in more efficient EMF based location discovery.

In an embodiment, the adjusting or defining the location estimate further may denote decreasing the area covered by the location estimate. In another embodiment, the adjusting or defining the location estimate further may denote enlarging the area covered by the location estimate. This may be the case, for example, when it is known that the entry to the stairway in the building is open and wide. Then, for example, WLAN signal may reach the PD 400 located in the stairway. In such case, the location estimate may be adjusted to cover the stairway as well.

In an embodiment, an identifier of the PD 400 is detected. This may imply that the PD 400 is or is not carried by, for example, an employer working in the building. This may be taken into account when further defining the location estimate of the PD 400. For example, let us imagine that there is a floor with three rooms, out of which one requires authorized access. It may be that only a staff member (e.g. an employer or an employee) is allowed to enter to the room. E.g. there may be a code needed for the entry. Now, if the person carrying the PD 400 does not belong to the staff of the company, on the basis of the detected identifier of the PD 400 and a staff or device database of the company, then some restricted areas may be excluded from the possible locations of the PD 400. Such further defining of the location estimate 402 may aid in selecting a smaller part 410 of the EMF map 408, which may consequently lead in more efficient EMF based location discovery.

Let us now take a look at different options regarding the roles of the PD 400 and the DBE 500. In an embodiment, as shown in FIG. 6A, the PD 400 may process the measurement result by itself in order to roughly locate itself in step 600. Then, in step 602, the PD 400 may itself access the map by selecting the part 410 of the EMF map 408, as explained above. This may be the case when the PD 100 itself stores or has access to the EMF map 408. Thereafter, in step 604, the PD 400 may apply the selected map part 410 in an EMF map based location determination. This step may comprise the DP 400 performing EMF vector measurements (magnitude and/or direction of the EMF vectors) with a magnetometer, for example, and comparing the measured EMF vector values to the selected EMF map part 410 in order to determine the location of the PD 400. As said, a multi-hypothesis location discovery may be used. The EMF map based location discovery may provide more accurate results than the rough WLAN location discovery. Further, it may allow the movements of the PD 400 to be tracked throughout the building 100 whereas, for example, RFID based location discovery may not be able to do so. It may be beneficial to use only part of the map as then the amount of data processed by the PD 400 is smaller. That is, the search space is limited to the selected part 410 of the EMF map 408, instead of going through the whole EMF map 408 which may comprise data for several buildings and for several floors, for example.

Figure 6D:
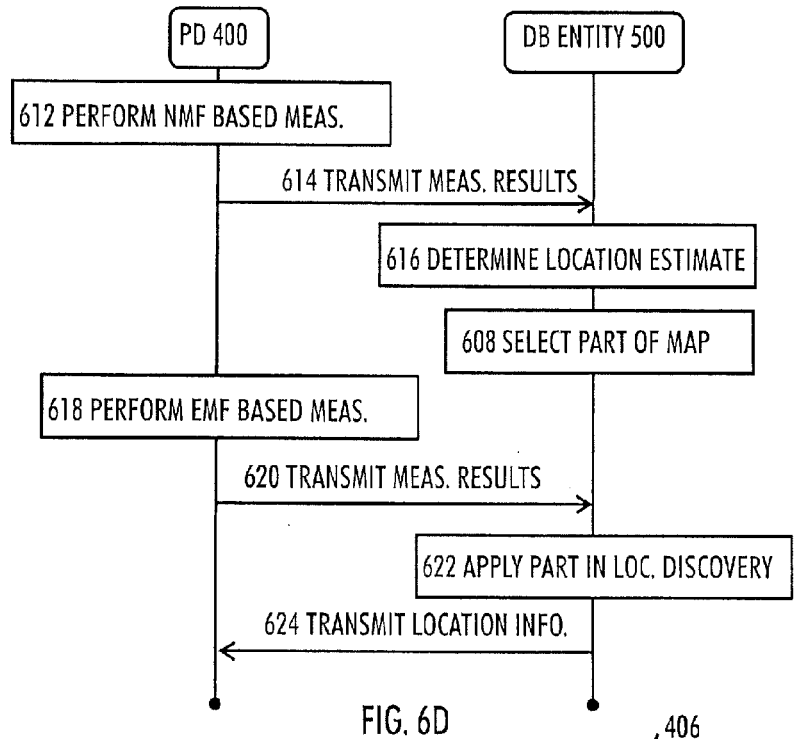

In some embodiments, as shown in FIGS. 6B, 6C and 6D, it is the DBE 500 which stores or accesses the EMF map 408. In FIG. 6B, the PD 400 may determine the location estimate as described in step 600 and transmit the location estimate, in step 606, to the DBE 500, which in this way acquires the location estimate of the PD 400. Thereafter, the DBE 500 having access to the EMF map 408 may select the map part 410 which corresponds to the location estimate in step 608. For example, if the location estimate implies that the PD 400 is in the building B, then the DBE 500 may select the part 410 which comprises only the building B, not buildings A and B. In step 610 the DBE 500 may transmit the selected part 410 of the EMF map 408 to the PD 400 in order to allow the PD 400 to apply the part 410 in the EMF map based location determination in step 604.

In yet one embodiment, as shown in FIG. 6C, the PD 400 may perform the required NMF based detections/measurements in step 612. Thereafter, instead of determining the location estimate of the PD 400 itself, the PD 400 may in step 614 transmit the detection/measurement results to the DBE 500. Then, the DBE 500 may in step 616 determine the location estimate of the PD 400 on the basis of the received measurement results, and in this way acquire the location estimate of the PD 400. For example, the measurement results may indicate the RSSIs from different WLAN base stations, air pressure sensor measurements for implying the location in the vertical direction (such as floors), camera images, and/or RFID detections. Thereafter, having obtained the knowledge of the location estimate of the PD 400, the DBE 500 may in step 608 select the map part 410, as earlier described. Further, in step 610 the DBE 500 may transmit the selected part 410 of the EMF map 408 to the PD 400 in order to allow the PD 400 to apply the part 410 in the EMF map based location determination in step 604.

In case of FIGS. 6B and 6C, it may be understood that selecting only a part 410 of the map 408 to transmit to the PD 400 is efficient from the point of view of channel capacity, delays, resource usage, for example. For example, the PD 400 acquires the relevant map part 410 to its use faster than in the case where the whole map 408 (of the building 100 or many buildings, for example) is exchanged from the DBE 500 to the PD 400. Further, the computational complexity of the PD 400 is reduces as it need not handle the whole map 408 but only a small part of the map. For example, it may be that the PD 400 executes a software application which needs to locate the PD 400 in order to perform its functionalities. In this case, the application may cause the PD 400 to trigger the NMF based location discovery, such as the RSSI measurement process. Such application may be so called location-aware applications, such as the FOURSQUARE™, etc.

The transmission of the selected map part 410 to the PD 400 in FIGS. 6B and 6C may be dependent on a request from the PD 400. That is, the DBE 500 may provide, on request, the selected part 410 of the indoor EMF map 408 to the PD 400 in order to allow the PD 400 to use the selected part 410 of the EMF map 408 in locating itself. The request may be an explicit request to transmit the part 410 of the map 408, or the transmission of the location estimate or the measurements result may be seen as an implicit request to execute the step of transmitting the part 410 to the PD 400. In other words, an indoor navigation circuitry of the DBE 500 may provide, on request, at least part 410 of the generated indoor magnetic field map 408 to the PD 400 that is to determine its location inside the building 100 to which the EMF map is applicable. The indoor navigation circuitry may provide the entire EMF map of the building 100 to the PD 400 via network. Alternatively, the indoor navigation circuitry may provide only a part 410 of the EMF map 408 to the positioning device 400, wherein the part 410 of the generated indoor EMF map 408 to provide is selected on the basis of location estimate 402 of the positioning device 400. By knowing the location of the PD 400, at least roughly, the indoor navigation circuitry may then provide EMF map only for the area where the PD 400 is currently moving, such as for the floor of the building where the PD 400 currently is. This may be advantageous so that only a part 410 of the large EMF map 408 needs to be communicated to the positioning device 400. The PD 400 may then use the map or part of the map in locating itself in the building 100. The indoor navigation circuitry may also be responsible for identifying the correct position in the building 100 and to cause initialization of the PD 400 with the location estimate and/or with the at least part 410 of the EMP map 408.

In yet one embodiment, as illustrated in FIG. 6D, the steps 612, 614, 616 and 608 are as they were in the case of FIG. 6C. However, instead of transmitting the selected part 410 to the PD 400, the PD 400 performs EMF vector measurements in step 618 and transmits the measurement results or information indicating the measured EMF vector (magnitude and/or direction) to the DBE 500 in step 620. The DP 400 may perform the EMF vector measurements and transmissions automatically or based on a request from the database entity 500. Thereafter, as the DBE 500 receives at least one measured magnetic field vector value (such as magnitude and/or direction) from the PD 400, the DBE 500 may in step 622 determine the location of the PD 400 on the basis of the received at least one measured magnetic field vector value and the selected part 410 of the indoor EMF map 408. This step 622 may comprise comparison of the received EMF vector value to the EMF vector values comprised in the selected map part 410 in order to determine the location of the PD 400 in the selected map area. As may be understood by a skilled person, it may be beneficial to perform the comparison to only a part 410 of the map instead of the whole map 408 from the point of view of computational efficiency and latency. Finally, in step 624, the DBE 500 may indicate the determined location of the PD 400 to the PD 400 in step 624. In this embodiment, the PD 400 need not itself determine its location, but it receives the accurate, EMF map based, location indication from the DBE 500. Thus, the operation of the PD 400 is simplified. This may be very advantageous considering the limited computational resources of the mobile PD 400 compared to the server-type functionalities of the DBE 500.

In an embodiment, as shown in FIGS. 7A and 7B, the device 400 or 500 may, after acquiring the location estimate 402 of the PD 400 in step 700, determine probabilities for possible locations of the PD 400 on the basis of the acquired location estimate 402 in step 702. For example, as indicated in some examples, the NMF based measurement results may imply with a high probability that the PD 400 is within certain floors of the building 100 or within a certain building, or in a certain area, such as a room, of the building 100. For example, it may be that the air pressure sensor or the RSSI detection may imply that the PD 400 is in floor N. Then, the location probability of the PD 400 may be higher in the floor N than in the floors above or below the floor N. The location probability for the PD 400 being in a floor N−1 may be higher than the location probability for the PD 400 being in a floor N−2, and so on.

As a further example, let us look at FIG. 7B which depicts the area 406 corresponding to the whole map 408. As said, the area 406 may be a building, a floor a part of a floor, etc. A location estimate 402 of the PD 400 has been acquired and it is shown with the dotted curve in FIG. 7B. The degree of the location probability of the PD 400, based on the location estimate 402, is represented with the radius or size of the ellipses 710 in the Figure. As may be seen, the location hypothesis for the locations in the area 406 which are far from the location implied by the location estimate 402 are given lower probabilities and the location hypothesis for the locations in the area 406 which are close to the location implied by the location estimate 402 are given higher probabilities. The probabilities may decrease linearly or exponentially as the distance for the location hypothesis for the PD 400 grows from the location estimate 402. Advantageously the device (either the PD 400 or the DBE 500) may then in step 704 limit or modify the search space for the indoor EMF map-based location determination of the PD 400 on the basis of the determined probabilities.

In an embodiment, limiting the search space may comprise, in step 706, applying a probability distribution in the indoor EMF map-based location determination of the positioning device 400, wherein the probability distribution emphasizes those locations which are most probable locations of the PD 400 according to the determined probabilities. As a consequence, the areas with low probability are not checked first or are given lower weights/importance in the indoor EMF map-based location discovery.

The probability distribution may be applied also for the selected part 410 of the EMF map 408 or for the whole map 408. In an embodiment, the corresponding apparatus 400 or 500 selects the part 410 from the EMF map 408 on the basis of the location estimate 402 and the determined probabilities. Thus, not only the location estimate 402 is used but also the probability distribution is used. This may provide more accurate selection of the part 410. For example, the determined probabilities may imply that a larger part (possibly including many rooms or floors) is to be selected even though the location estimate implies that the PD 400 is in one room or in one floor, respectively.

In one embodiment, the corresponding device 400 or 500 applies the probability distribution to the selected part 410 of the EMF map 408. This embodiment may provide faster convergence to the correct hypothesis than in a case where no probability distribution is applied.

In an embodiment, the DBE 500 may use the determined probabilities in the EMF based location discovery. In another embodiment, the PD 400 may use the determined probabilities in the EMF based location discovery. In this embodiment, it may be that the DBE 500 determines the probabilities and transmits the probabilities or probability distribution to the PD 400.

In an embodiment, as shown in FIG. 8A, the either the PD 400 (as in FIGS. 6A-6C) or the DBE 500 (as in FIG. 6D) may in step 800 detect the current location of the PD 400. This may take place by applying location hypothesis to the whole or selected EMF map part 410 on the basis of is EMF vector measurements performed by the PD 400, for example. As the current location is accurately known on the basis of the EMF map based location discovery, the PD 400 may measure at least one measurement parameter value related to the indoor NMF based location discovery system at the detected current location of the PD 400. In case the indoor NMF based location discovery system is the RF base station based discovery system, the at least one measurement parameter value may be the values of the RSSIs of WLAN base stations, for example. In case the indoor NMF based location discovery system applies air pressure sensors, the at least one measurement parameter value may be the atmospheric pressure in the location as measured by the air pressure sensor of the PD 400. In an embodiment, the PD 400 may then transmit the at least one measurement parameter value to the DBE 500. In any case the device 400/500 acquires the at least one measurement parameter value related to the indoor NMF based location discovery system at the detected current location of the PD 400 in step 802. As this value is acquired, the corresponding device 400/500 may in step 804 apply the acquired at least one value for an update of a map of the indoor NMF based location discovery system. For example, when the value is the RSSI of the WLAN base stations, the update may comprise updating the current value of the radio map with the acquired value. The current value may not represent the current situation in the building because, for example, furniture may have been added or moved since the last RSSI measurement. In this way the role of the indoor NMF based location discovery system may be two-fold: firstly it may be used to provide the (rough) location estimate of the PD 400 and secondly, once the accurate location is known on the basis of the EMF map based discovery, the NMF based location discovery system may be updated.

It should be noted that the PD 400 may have moved from the area corresponding to the location estimate 402. In an embodiment, the location estimate 402 is used only for initialization of the EMF based location discovery after which the moving PD 400 may have moved away from the location area. The accurate location of the PD 400 may nevertheless be accurately tracked even on move by applying the EMF based location estimation. In another embodiment, the NMF based location discovery, such as the WLAN tracking, is used also later on during the movement of the PD 400. In such case, the PD 400 may measure both, the EMF vectors and the RSSIs of the WLAN base stations, and apply both measurements in the location discovery.

One example of the update is shown in FIG. 8B, in which the location estimate on the basis of the NMF based location discovery is acquired in step 810. In steps 812 and 814 the DBE 500 (in this example embodiment) selects the EMF map part 410 and applies the part 410 and EMF measurements results from the PD 400 in the EMF based location discovery.

This EMF map based location discovery may provide accurate location of the PD 400 so that the current location of the PD 400 may be known, even though the PD is moving or has moved away from the initial location estimation. Thereafter in step 816, the PD 400 may transmit the at least one measurement parameter value related to the indoor NMF based location discovery system at the detected current location to the DBE 500. The PD 400 may be requested to do so, or the PD 400 may do so automatically. In step 818, the DBE 500 may then cause an update of the indoor NMF map, such as the update of a radio map comprising RSSIs at each location. This may provide an efficient means to keep the NMF based map up-to-date.

An actuation of a predetermined software function in or with respect to the PD 400 may be automatically caused when it is detected that the PD 400 is in a certain location. The database entity 500 may cause the activation by sending a command to the PD 400, or the PD 400 may cause the activation itself. Such a predetermined software function may comprise for example a navigation system. For example, when it is detected that the PD 400 is in an area in which WLAN base station signal is or should be present (on the basis of the current radio map, for example), the PD 400 may be requested to provide, or provide without request, current RSSI value(s) in that area so as to enable the radio map update. One example scenario is that the location estimate is acquired by applying an RFID technique. Then the PD 400 may move away from the presence of the RFID spot. The location of the PD 400 may be nevertheless tracked by applying the EMF based location discovery. When the detected current location of the PD 400 (on the basis of the EMF based tracking) is such where WLAN base station based indoor location tracking is available, the PD 400 may then provide or be requested to provide the RSSI values in the area for the update of eh radio map. It should be noted that the DBE 500, for example, may be aware of the radio maps of the buildings.

In another embodiment, such a predetermined software function may comprise for example a reference to a social network. For example, such a reference may be a check-in to FACEBOOK™ Places, FOURSQUARE™ social network, a status update to FACEBOOK™, or to TWITTER™, wherein the status update refers to the location of the user associated with the PD 400, for example. In other words, when it is detected that the operational environment has changed, for example, from outdoors to indoors, the PD 400 may automatically check-in to FOURSQUARE™. This may be advantageous for the user so that the user need not himself perform the reference to the social network.

Further, in an embodiment, the entry of the building among a plurality of entries may be detected. This may further aid in specifying the check-in location of the user to the building so that the check-in location may correspond to the specific entry of the building. Knowing the exact location of entry in to the building 100, may serve as a trigger to cause the initialization of the PD 400 with at least part of the EMF map of the building 100, wherein the part of the EMF map comprises at least the location of entry. That is, the location estimation may cover the area in which the entry to the building is. Such detection of entry may be performed on the basis of the NMF based location detection, such as an RFID or BLUETOOTH™, for example.

As said, after the location estimate has been utilized in initializing the EMF-based location discovery, the tracking of the PD 400 may take place by applying the EMF vector measurements and the EMF map 408. It should be noted that the EMF map 408 may comprise vector values (such as magnitude and direction) which correspond to values (such as direction) when the PD 400 is kept in a predetermined three-dimensional orientation. However, a person carrying the PD 400 may not all the time keep the PD 400 in correct angles with respect to the frame of reference of the building 100 represented with XYZ coordinates. In particular, the PD 400 may be rotated about at least one of the three axis X, Y and Z, as shown in FIG. 2C. This may lead to inaccurate EMF measurements being carried out by the PD 400 with respect to the direction of the EMF vector being and, thus, lead to erroneous or inefficient location discovery and/or tracking or to erroneous or non-optimal initial location estimate. It should be noted that although observing the magnitude may in some cases be sufficient for detecting the change of the operational environment and/or for the location estimation/tracking, observing the direction may provide additional accuracy and efficiency. This is because more information, including the direction, may be utilized.

Therefore, in an embodiment, information indicating the three-dimensional orientation of the PD 400 may be acquired by the PD 400 or by the database entity 500 at the at least one time instant when the EMF vector is measured, wherein the EMF vector is measured by the PD 400 and defined in the frame of reference (X', Y', Z') of the PD 400, as shown in FIG. 2C. However, (X', Y', Z') is not the same as (X, Y, Z). Thus, error may occur without adjusting/rotating/correcting the acquired EMF vector from the frame of reference (X', Y', Z") of the PD 400 to the frame of reference (X, Y, Z) of the floor plan. The adjustment may be made at least partly on the basis of the acquired information indicating the three-dimensional orientation (X', Y', Z') of the PD 400.

The three-dimensional orientation of the PD 400 may be defined by at least one of the following: a rotation with respect to a first horizontal axis (such as X-axis or Y-axis), a rotation with respect to a second horizontal axis (such as Y-axis or X-axis, respectively), and a rotation with respect to a vertical axis Z. Let us consider this in more detail by referring to FIG. 9. In FIG. 9, the solid arrows represent the world XYZ coordinate system and the dotted lines show the frame of reference of the PD 400. FIG. 9A shows how the PD 400 may be rotated about Y-axis. In FIG. 9, the X direction represents the direction from the point (X1, Y1) to the point (X2, Y2) in FIG. 1, for example. That is, in FIG. 9A, the Y-axis points towards the paper. In FIG. 9B, the PD 400 is rotated about X-axis, which points towards the paper. In order to determine the amount of rotation about the Y-axis (FIG. 9A) and about X-axis (FIG. 9B), the PD may be in one embodiment equipped with inertial measurement unit (IMU). The IMU may comprise at least one acceleration sensor utilizing a gravitational field. The IMU may optionally also comprise other inertial sensors, such as at least one gyroscope, for detecting angular velocities, for example. The acceleration sensor may be capable of detecting the gravitational force G. By detecting the acceleration component G caused by the Earth's gravitation in FIGS. 9A and 9B, the PD 400 may be able to determine the amount of rotation about axis X and/or Y. In another embodiment, the IMU may detect the movement of the person carrying the PD 400. This may advantageously allow the speed and direction of the person to be determined.

Although the rotation about the X and Y axis may in general be correctable because the global reference (the gravitational force G) is present, the rotation about the Z-axis as shown in FIG. 9C may not be corrected as easily. This may be due to lack of the global reference similar to G. Rotations relative to the PD 400 may be detected by using the at least one gyroscope comprised in the IMU. However, the gyroscope may not be able to follow the absolute rotation in the world coordinate system. In addition, the gyroscope may drift from the correct orientation due to gyroscope sensor inaccuracies such as sensor noise and bias. However, for the correction about the Z axis, another global reference may be used than the gravitational force G. Let us look at this next.

Let us assume that the PD 400 measures EMF vectors at any given point inside the building 100. Let us also assume that there exists an EMF map for the building 100, or at least for a part of the building 100. The EMF map may indicate EMF vector magnitude and/or three-dimensional direction for a given location in the building 100 or in a part of the building 100. As said, incorrect orientation of the PD 400 may lead to erroneous results or to a situation where only the magnitude of the EMF vector can be utilized but not the direction of the EMF vector in addition to the magnitude of the EMF vector. Therefore it is beneficial to adjust the measured magnetic field vector from the frame of reference of the PD 400 to the frame of reference of the floor plan the building 100. This may be done at least partly on the basis of the knowledge of the direction of the true magnetic field vector F, as referred in FIG. 9C, at the location where the PD 400 is assumed to be located (i.e. at the location hypothesis of the PD 400). It should be noted that the measured EMF vector may be defined in the frame of reference of the PD 400 having an arbitrary three-dimensional orientation, thus possibly leading to useless data with respect to the EMF vector direction. The direction of the true magnetic field vector for the at least one position hypothesis of the PD 400 may be determined on the basis of a predetermined EMF map at the at least one location corresponding to the at least one position hypothesis of the PD 400. The predetermined EMF map may comprise position hypothesis outside the building and/or inside the building. When correcting the measured EMF vector direction for a PD 400 locating indoors, the predetermined EMF map may be the indoor EMF map. When using multi-hypotheses location estimation, the number of hypotheses in the beginning may be large, such as over 1000 hypotheses. However, by knowing the direction of references F and G at each of the plurality of position hypothesis, the three-dimensional orientation of the PD 400 may be adjusted to, or at least close to, the correct frame of reference.

For example, when there are two position hypotheses, the three-dimensional orientation adjustment at the correct location hypothesis performs better than at the false location hypothesis. This is because, when correcting the rotation based on Earth's gravitation G, the inclination of the measured EMF vector should approach the true EMF vector inclination F. If this is not the case, the position hypothesis may be determined as not correct or the probability of the reliability of the position hypothesis may be given a low value. This is because at a false position hypothesis, a wrong EMF vector direction F may be used. On the contrary, the orientation adjustment at the correct position hypothesis based on G, makes the measured inclination and true inclination F to be closer to each other. Then, the three-dimensional orientation correction based on F may be conducted, i.e. the three-dimensional orientation of the PD 400 with respect to the rotation about the Z-axis may be corrected at least partly based on F. The correction may be performed by the PD 400 or the database entity 500. Such three-dimensional orientation correction may be conducted even off-line if the PD 400 is equipped with the EMF map data. This way the three-dimensional orientation of the PD 400 may be adjusted properly and correct values of EMF measurement vector may be obtained. The orientation adjustment may allow efficient location estimation based on direction of the EMF 208, in addition to or instead of the magnitude of the EMF 208.

However, in case the rotation about the z-axis cannot be corrected, which may be due to the lack of EMF map data (i.e. a global reference) for the location or location hypothesis of the PD 400, it may still be advantageous to determine the magnitude of the XY-plane projection and the magnitude of the Z-component. As said, the rotations about the XY-plane may be corrected using the global reference G. Namely, the norm of the XY-plane projection $\|m\|_{xy}$ of the EMF vector $m=(x, y, z)$ may be determined as $\|m\|_{xy} = \sqrt{x^2+y^2}$ even without adjusting the rotation about the Z-axis. As a result, the feature vector $(z, \|m\|_{xy})$ may be computed from the tilt compensated magnetic field observation, which feature vector is invariant to the rotation about the Z-axis. These two features enable for more EMF vector information than the magnitude alone, because the magnitude may be represented separately for the Z-axis component and for the XY-plane projection.

As explained, in an embodiment, the three-dimensional orientation correction at least partly based on the true magnetic field vector direction F is performed for determining probabilities for position hypotheses applied by multi-hypothesis location estimation. In this case, the orientation correction may be performed at each position hypothesis. The multi-hypothesis location estimation may comprise 1) applying a motion model for at least part of the position hypotheses based on the motion information, 2) orientation adjustment from the frame of reference of the PD 400 to the frame of reference of the building 100 (or to another predetermined frame of reference), 3) comparing the measured, orientation adjusted EMF vector (or computed feature vector) to the EMF vector (or computed feature vector) acquired from the map at position hypothesis, 4) determining probability of being a correct hypothesis for each position hypothesis on the basis of the comparison and optionally also on the basis of the reliability of the orientation adjustment, and 5) updating a posteriori probability distribution represented by the position hypotheses. Step 1-5 may be repeated without limit for a predetermined number of times, or as long as a certain threshold with respect to accuracy or characteristics of a posteriori probability distribution is met. At some point in time, the position hypotheses close to the correct position may have high probabilities, whereas the false positions may be associated with low probabilities (or lower probabilities). This way it may be determined, at each point of time, where the PD 400 is located in the building. Once the location estimates are converged, the tracking of the object, such as the PD 400, may be started. The orientation correction using the map data as the global reference may advantageously allow the multi-hypothesis location estimation to converge faster to the correct position/location hypothesis.

In an embodiment, the orientation correction is implemented, e.g., by applying an orientation filter for MARG (Magnetic, Angular Rate, and Gravity) sensor implementation in each position hypothesis. The MARG sensor contains a three-axis magnetometer, a three-axis angular rate sensor, and a three-axis accelerometer. The orientation filter can be, e.g., a quaternion, gradient decent, Kalman filter (KF), or extended Kalman filter (EKF) based implementation, or a hybrid implementation. Each position hypothesis may maintain own orientation estimate, which is periodically updated, by the orientation filter, for each new sensor observation consisting of acceleration, angular velocity, and magnetic field measurements. For each update step, the true EMF vector F is used as the global magnetic field reference by the orientation filter. The vector F is acquired from the map at the location indicated by the specific location hypothesis, and is used by the orientation filter together with the sensor observation to update the orientation estimate of the specific location hypothesis.

In an embodiment, the mounted low range communication unit may be coupled to a controller and to a calibration circuitry & correction circuitry for co-operating in calibration of the PD 400. For example, the exact magnitude of the EMF may be predetermined and stored in the memory of the mounted low range communication unit. Then the PD 400 may apply this information in obtaining knowledge of how much the measured EMF magnitude deviates from the indicated, true EMV magnitude. Based on the information, a correction of the values provided by the magnetometer or calibration of the magnetometer may be in order. The calibration or correction process may be carried out in various manners. Let us consider the case where two RFID units are connected to each other. The second RFID unit of the PD 400 may receive the true magnetic field information from the first, mounted RFID unit. Then the PD 400 may apply the received information in calibration of its magnetometer in order for the magnetometer to provide accurate and true EMF vector data. Alternatively, the PD 400 may apply the received information in correcting each value provided by the magnetometer so as to provide accurate and true EMF vector data. In another embodiment, the PD 400 may inform the correction that needs to be used for the EMF vector data received from this specific PD 400 to any element handling the EMF values provided by this specific PD 400. It should be clear that the difference between the true and measured EMF vectors may be determined at the PD 400 or at the mounted RFID unit, as the case may be. The calibration/correction may be for the strength of the EMF vector, and/or for an EMF bias (offset) vector affecting to the EMF measurements acquired by the PD 400. Alternatively, or in addition to, the calibration/correction may be for the direction of the EMF vector. The calibration process may also calibrate/correct data related to the direction and/or strength of the measured acceleration vector representing the direction of the gravitational force G. For this, the true value for G may have been determined for the predetermined location of the mounted low range communication unit.

In an embodiment, the EMF bias (offset) vector affecting to the EMF vector measurements acquired by the PD 400 may be determined based on the difference between the measured EMF vector and the true EMF vector at the location or at the location hypothesis of the PD 400, wherein the true EMF vector may be obtained from the EMF map of the building 100. Once the bias is determined, it may be added to or deducted from the measured value in order to obtain the correct EMF vector value, such as the correct magnitude of the EMF. The bias thus represents the difference of the measured value and the true value. It may be that the bias is caused by the equipment to which the PD 400 is mounted, or by a metallic object locating near (e.g. in a pocket or in a bag of a user) the PD 400. For example, when the PD 400 is mounted to the shopping cart, the cart may cause the same bias to the measured EMF values at each location of the building 100. Then it may be advantageous to first measure the bias at one predetermined location and then apply the bias in other places inside the building 100. The predetermined location may be detected as described above. Alternatively, the bias may be computed individually for each location hypothesis at the beginning of the location estimation process, and the bias estimate for each hypothesis may be updated incrementally/periodically during the location estimation and/or tracking process. It should be noted that this procedure may also aid in determining probabilities for the location hypothesis. For example, if the location hypothesis, where the bias is determined, is correct, the bias is properly determined and may increase the probability of the true location hypothesis due to correct, bias adjusted EMF vector observations. However, if the location hypothesis is not correct, the bias determined at that position may be false. This false bias may also lead to erroneous EMF vector observations from the point of view of the incorrect position hypothesis, which may decrease the probability associated with the false location hypothesis, and, thus, promote the correct location/position hypothesis. In addition or alternatively to the bias, a scaling factor may be similarly determined and applied. The scaling factor may be used to calibrate the magnetometer of the PD 400 so that it provides EMF vector magnitude values which are comparable to the EMF vector magnitude values provided by another measuring device used to generate the EMF map. In addition, if the bias and/or scaling factor are updated incrementally/periodically for each location hypothesis, the statistical properties, such as variance, of the bias/scaling factor estimates may further provide information about the correctness of the specific position hypothesis.

Embodiments, as shown in FIGS. 10 and 11, provide apparatuses 400 and 500 comprising at least one processor 452, 502 and at least one memory 454, 504 including a computer program code, which are configured to cause the apparatuses to carry out functionalities according to the embodiments. The at least one processor 452, 502 may each be implemented with a separate digital signal processor provided with suitable software embedded on a computer readable medium, or with a separate logic circuit, such as an application specific integrated circuit (ASIC).

The apparatuses 400 and 500 may further comprise radio interface components 456 and 506 providing the apparatus 400, 500, respectively, with radio communication capabilities with the radio access network. The radio interfaces 456 and 506 may be used to perform communication capabilities between the apparatuses 400 and 500. For the transmission and/or reception of information, the apparatuses may apply, for example, wireless cellular radio network. The radio interfaces may also be used for measuring the WLAN signal strengths, for example. Alternatively, for example, short range radio communication techniques including wireless local area network and BLUETOOTH™, may be applied. The radio interfaces 456 and 506 may be used to communicate data related to the EMF map, the measured EMF vectors, location estimation, initialization, NMF based location discovery, etc.

User interfaces 458 and 508 may be used in operating the measuring device 400 and the database entity 500 by a user. The user interfaces 458, 508 may each comprise buttons, a keyboard, means for receiving voice commands, such as microphone, touch buttons, slide buttons, etc.

The apparatus 400 may comprise the terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities. Further, the apparatus 400 may be or comprise a module (to be attached to the terminal device) providing connectivity, such as a plug-in unit, an "USB dongle", or any other kind of unit.

As said, the apparatus 400, such as the positioning device, may comprise the at least one processor 452. The at least one processor 452 may comprise an indoor & outdoor navigation circuitry 460 for performing indoor or outdoor navigation. The indoor navigation may be on the basis of Earth's magnetic field measurement and EMF map, on the basis of NMF based location discovery system, on the basis of RE signal strengths, and/or on the basis of visual or distance based location estimation. The circuitry 460 may also be responsible for identifying the correct position in the building 100 and to cause initialization of the PD 400 with the location estimate and/or with the at least part of the EMF map. The circuitry 460 may apply for example multi-hypotheses location estimation. An application activation circuitry 464 may be responsible of activation of a software function in or with respect to the PD 400. Such function may be for example the check-in in FOURSQUARE™ or FACEBOOK™ Places, activation of indoor navigation system, etc. A calibration & correction circuitry 466 may be responsible of performing a calibration process of a magnetometer 470 and/or correcting the acquired information from the magnetometer 470, for example.

As said, the apparatus 400, such as the positioning device, may comprise the at least one processor 452. The at least one processor 452 may comprise an indoor & outdoor navigation circuitry 460 for performing indoor or outdoor navigation. The indoor navigation may be on the basis of Earth's magnetic field measurement and EMF map, on the basis of NMF based location discovery system, on the basis of RF signal strengths, and/or on the basis of visual or distance based location estimation. The circuitry 460 may also be responsible for identifying the correct position in the building 100 and to cause initialization of the PD 400 with the location estimate and/or with the at least part of the EMF map. The circuitry 460 may apply for example multi-hypotheses location estimation. An application activation circuitry 464 may be responsible of activation of a software function in or with respect to the PD 400. Such function may be for example the check-in in FOURSQUARE™ or FACEBOOK™ Places, activation of indoor navigation system, etc. A calibration & correction circuitry 466 may be responsible of performing a calibration process of a magnetometer 470 and/or correcting the acquired information from the magnetometer 470, for example.

The magnetometer 470 may be used to measure the EMF vector. There may be various other sensors or functional entities comprised in the PD 400. These may include an inertial measurement unit (IMU) 472, an odometer 474, a low range communication unit 476, a GPS sensor 478, a radio frequency (RF) based location tracking sensor 480, at last one camera 482, at last one air pressure sensor 484, for example. A skilled person understood that these may be of use when performing the embodiments as described earlier. For example, the RF based location tracking sensor 480 may detect the RF signal from a near-by RF base station, (e.g. WLAN) and determine a location of the PD 400 based on the signal strength. The IMU 472 and the odometer 472 may be used to detect movement of the PD 400 and to enable three-dimensional orientation estimation of the PD 400. The IMU 472 may comprise for example acceleration sensor and a gyroscope, for example. The GPS sensor 478 may aid in outdoor navigation. The at least one camera 482 may be used to capture images for the purposes of any of the embodiments described. As shown in FIG. 9A, the PD 400 may comprise one camera on each side of the PD 400, i.e. cameras 482A and 482B) in order to enable capturing images from the ceiling and from the floor, for example. Such additional information may be useful in locating the PD 400 in the building with more accuracy. The air pressure sensor 484 may be used to provide information on the altitude of the PD 400, i.e. information on the location of the PD 400 in the vertical direction. The memory 454 may comprise information of the magnetic field map 490 and of the floor plan 492 of the building 100, for example. The memory may also store data related to the NMF based location discovery 494, such as radio maps comprising the RSSIs at each location from each detectable WLAN base station. The memory may also be used for storing measured EMF values, for example. However, as said, the data may be also stored in the apparatus 500, for example, wherein the PD 400 has a network access to the apparatus 500.

Although not shown, the apparatus 400 may comprise a MARG sensor (described above) which may comprise or apply one or more of the functional entities of the apparatus 400, such as the magnetometer 470, an inertial measurement unit (NU) 472, an odometer 474, etc.

An application activation circuitry 514 may be responsible of causing an activation of a software function in or with respect to the PD 400. The database entity 500 may for example indicate to the PD 400 that an activation of software function is in order. Such function may be for example the check-in in FOURSQUARE™ or FACEBOOK™ Places, activation of indoor navigation system, removal of access rights, etc. A calibration & correction circuitry 516 may be responsible of causing or co-operating in a calibration process of a magnetometer 470 of the PD 400 and/or correcting the acquired information from the magnetometer 470, for example. Further, the calibration & correction circuitry 516 may be responsible of making the orientation correction with respect to the frame of reference of the PD 400. As said, in an embodiment, the PD 400 is aware of the (X, Y, Z) world coordinate system and makes the correction between the frame of references itself before indicating the direction of the EMF vector to the database entity 500. In another embodiment, the measuring device 400 indicates the possibly uncorrected EMF vector direction to the database entity 500 along with information regarding the three-dimensional orientation of the measuring device 400, and the database entity 500 makes the correction/adjustment by the calibration & correction circuitry 516 so as to yield the true direction of the magnetic field vector to be comprised in the generated EMF map.

An application activation circuitry 514 may be responsible of causing an activation of a software function in or with respect to the PD 400.

The database entity 500 may for example indicate to the PD 400 that an activation of software function is in order. Such function may be for example the check-in in FOURSQUARE™ or FACEBOOK™ Places, activation of indoor navigation system, removal of access rights, etc. A calibration & correction circuitry 516 may be responsible of causing or co-operating in a calibration process of a magnetometer 470 of the PD 400 and/or correcting the acquired information from the magnetometer 470, for example. Further, the calibration & correction circuitry 516 may be responsible of making the orientation correction with respect to the frame of reference of the PD 400. As said, in an embodiment, the PD 400 is aware of the (X, Y, Z) world coordinate system and makes the correction between the frame of references itself before indicating the direction of the EMF vector to the database entity 500. In another embodiment, the measuring device 400 indicates the possibly uncorrected EMF vector direction to the database entity 500 along with information regarding the three-dimensional orientation of the measuring device 400, and the database entity 500 makes the correction/adjustment by the calibration & correction circuitry 516 so as to yield the true direction of the magnetic field vector to be comprised in the generated EMF map.

As may be understood by a skilled person from the description of the embodiments throughout the application and from FIGS. 10 and 11, the embodiments may be performed in the PD 400, in the database entity 500, or the execution of embodiments may be shared among the PD 400 and the database entity 500. The skilled person also understands that any required filtering logic may be applied to filter the EMF measurements in order to improve the accuracy.

According to an aspect of the invention, there is provided a method, comprising: acquiring, by a positioning device or by a database entity, a location estimate of the positioning device that is to determine its location inside a building, wherein the location estimate is acquired on the basis of an indoor non-magnetic field based location discovery system; accessing an indoor Earth's magnetic field, EMF, map of plurality of buildings, wherein the indoor EMF map represents at least one of magnitude and direction of the Earth's magnetic field affected by the local structures of a corresponding building; and selecting a part of the indoor EMF map on the basis of the location estimate of the positioning device, wherein the selected part of the indoor magnetic field map includes the indoor EMF map for the area in which the positioning device currently is.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

According to an embodiment, there is provided an apparatus comprising processing means configure to carry out an embodiment according to any of the FIGS. 1 to 11. In an embodiment, the at least one processor 452 or 502, the memory 454 or 504, respectively, and a corresponding computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus, comprising:
   at least one processor and at least one memory including a computer program code, wherein the at least one memory and the computer program code are configured to, with the at least one processor, cause the apparatus at least to:
   acquire a location estimate of a positioning device that is to determine its location inside a building, wherein the location estimate is acquired on the basis of an indoor non-magnetic field based location discovery system;
   access an indoor Earth's magnetic field, EMF, map of a plurality of buildings, wherein the indoor EMF map represents at least one of magnitude and direction of the Earth's magnetic field affected by the local structures of a corresponding building;
   select a part of the indoor EMF map on the basis of the location estimate of the positioning device, wherein the selected part of the indoor magnetic field map includes the indoor EMF map for the area in which the positioning device currently is; and
   adjust the acquired location estimate further on the basis of at least one of a topology or layout of the building in which the positioning device is and a detected identity of the positioning device.

2. The apparatus of claim 1, wherein the at least one memory and the computer program code are configured, with the at least one processor, to cause the apparatus further to:
   apply the selected part of the indoor EMF map in an indoor EMF map-based location determination, wherein the apparatus is or is comprised in the positioning device.

3. The apparatus of claim 1, wherein the at least one memory and the computer program code are configured, with the at least one processor, to cause the apparatus further to:
   provide, on request, the selected part of the indoor EMF map to the positioning device in order to allow the positioning device to use the selected part of the map in locating itself.

4. The apparatus of claim 1, wherein the at least one memory and the computer program code are configured, with the at least one processor, to cause the apparatus further to:

receive at least one measured EMF vector value from the positioning device;

determine the location of the positioning device on the basis of the received at least one measured EMF vector value and the selected part of the indoor EMF map in an indoor EMF map-based location determination; and indicate the determined location of the positioning device to the positioning device.

5. The apparatus of claim 1, wherein the at least one memory and the computer program code are configured, with the at least one processor, to cause the apparatus further to:

determine probabilities for possible locations of the positioning device on the basis of the acquired location estimate; and limit a search space for an indoor EMF map-based location determination of the positioning device on the basis of the determined probabilities.

6. The apparatus of claim 5, wherein limiting the search space comprises applying a probability distribution in the indoor EMF map-based location determination of the positioning device, wherein the probability distribution emphasizes those locations in the indoor EMF map which are most probable locations of the positioning device according to the determined probabilities.

7. The apparatus of claim 5, wherein the at least one memory and the computer program code are configured, with the at least one processor, to cause the apparatus further to:

select the part from the indoor EMF map on the basis of the location estimate and the determined probabilities.

8. The apparatus of claim 5, wherein the probability distribution is applied to the selected part of the indoor EMF map.

9. The apparatus of claim 1, wherein the indoor non-magnetic field based location discovery system utilizes an indoor radio frequency base station based location discovery system.

10. The apparatus of claim 9, wherein the indoor radio frequency base station based location discovery system applies a wireless local area network.

11. The apparatus of claim 1, wherein the applied indoor non-magnetic field based location discovery system utilizes at least one air pressure sensor.

12. The apparatus of claim 1, wherein the applied indoor non-magnetic field based location discovery system utilizes radio frequency identification.

13. The apparatus of claim 1, wherein the at least one memory and the computer program code are configured, with the at least one processor, to cause the apparatus further to:

identify, on the basis of the location estimate, the building, among a plurality of buildings, in which the positioning device currently is, wherein the selected part of the indoor EMF map includes the indoor EMF map for the identified building.

14. The apparatus of claim 1, wherein the at least one memory and the computer program code are configured, with the at least one processor, to cause the apparatus further to:

identify, on the basis of the location estimate, a floor of a multi-story building in which the positioning device currently is, wherein the selected part of the indoor EMF map includes the indoor EMF map for the identified floor of the multi-story building.

15. The apparatus of claim 14, wherein the selected part of the indoor EMF map includes the indoor EMF map for the identified floor of the multi-story building and in addition the indoor EMF map for a predetermined number of adjacent floors.

16. The apparatus of claim 1, wherein the at least one memory and the computer program code are configured, with the at least one processor, to cause the apparatus further to:

detect the current location of the positioning device in the building, wherein the current location is known on the basis of at least part of the indoor EMF map and magnetic field vector measurements performed by the positioning device;

acquire at least one measurement parameter value related to the indoor non-magnetic field based location discovery system at the detected current location of the positioning device; and apply the acquired at least one measurement parameter value for an update of a map of the indoor non-magnetic field based location discovery system.

17. The apparatus of claim 16, wherein the at least one memory and the computer program code are configured, with the at least one processor, to cause the apparatus further to:

perform an update of a radio map on the basis of the acquired at least one measurement parameter value, wherein the at least one measurement parameter value comprises received signal strength of radio frequency signals.

18. An apparatus, comprising:

at least one processor and at least one memory including a computer program code, wherein the at least one memory and the computer program code are configured to, with the at least one processor, cause the apparatus at least to:

acquire a location estimate of a positioning device that is to determine its location inside a building, wherein the location estimate is acquired on the basis of an indoor non-magnetic field based location discovery system;

access an indoor Earth's magnetic field, EMF, map of a plurality of buildings, wherein the indoor EMF map represents at least one of magnitude and direction of the Earth's magnetic field affected by the local structures of a corresponding building;

select a part of the indoor EMF map on the basis of the location estimate of the positioning device, wherein the selected part of the indoor magnetic field map includes the indoor EMF map for the area in which the positioning device currently is; and identify, on the basis of the location estimate, a floor of a multi-story building in which the positioning device currently is, wherein the selected part of the indoor EMF map includes the indoor EMF map for the identified floor of the multi-story building, and the selected part of the indoor EMF map includes the indoor EMF map for the identified floor of the multi-story building and in addition the indoor EMF map for a predetermined number of adjacent floors.

19. An apparatus, comprising:

at least one processor and at least one memory including a computer program code, wherein the at least one memory and the computer program code are configured to, with the at least one processor, cause the apparatus at least to:

acquire a location estimate of a positioning device that is to determine its location inside a building, wherein the location estimate is acquired on the basis of an indoor non-magnetic field based location discovery system;

access an indoor Earth's magnetic field, EMF, map of a plurality of buildings, wherein the indoor EMF map represents at least one of magnitude and direction of the Earth's magnetic field affected by the local structures of a corresponding building;

select a part of the indoor EMF map on the basis of the location estimate of the positioning device, wherein the selected part of the indoor magnetic field map includes the indoor EMF map for the area in which the positioning device currently is;

detect the current location of the positioning device in the building, wherein the current location is known on the basis of at least part of the indoor EMF map and magnetic field vector measurements performed by the positioning device;

acquire at least one measurement parameter value related to the indoor non-magnetic field based location discovery system at the detected current location of the positioning device;

apply the acquired at least one measurement parameter value for an update of a map of the indoor non-magnetic field based location discovery system; and perform an update of a radio map on the basis of the acquired at least one measurement parameter value, wherein the at least one measurement parameter value comprises received signal strength of radio frequency signals.

* * * * *